United States Patent
Bouley et al.

(10) Patent No.: US 9,282,051 B2
(45) Date of Patent: Mar. 8, 2016

(54) CREDIT-BASED RESOURCE ALLOCATOR CIRCUIT

(71) Applicant: Netronome Systems, Inc., Santa Clara, CA (US)

(72) Inventors: Richard P. Bouley, Maynard, MA (US); Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 392 days.

(21) Appl. No.: 13/928,235

(22) Filed: Jun. 26, 2013

(65) Prior Publication Data

US 2015/0003250 A1 Jan. 1, 2015

(51) Int. Cl.
*G06F 9/46* (2006.01)
*H04L 12/801* (2013.01)
*H04L 12/911* (2013.01)

(52) U.S. Cl.
CPC .............. *H04L 47/39* (2013.01); *H04L 47/822* (2013.01)

(58) Field of Classification Search
None
See application file for complete search history.

(56) References Cited

U.S. PATENT DOCUMENTS

| | | | | |
|---|---|---|---|---|
| 6,311,188 B1 * | 10/2001 | van der Linden | ......... | G06F 7/76 707/696 |
| 7,150,021 B1 * | 12/2006 | Vajjhala | ................ | G06F 13/364 718/103 |
| 2004/0148420 A1 * | 7/2004 | Hinshaw | ........... | G06F 17/30477 709/231 |
| 2007/0198983 A1 * | 8/2007 | Favor | .................... | G06F 9/5061 718/104 |
| 2008/0263555 A1 * | 10/2008 | Ventroux | .............. | G06F 9/4881 718/103 |
| 2009/0055829 A1 * | 2/2009 | Gibson | ................. | G06F 9/4881 718/103 |
| 2009/0276771 A1 * | 11/2009 | Nickolov | .............. | G06F 9/4856 717/177 |
| 2010/0031003 A1 * | 2/2010 | Chen | .................... | G06F 9/30021 712/30 |
| 2010/0107173 A1 * | 4/2010 | Chassin | ............... | G06Q 20/102 718/104 |
| 2010/0306595 A1 * | 12/2010 | Murata | ............... | G06F 11/3688 714/39 |
| 2014/0006665 A1 * | 1/2014 | Amano | ................. | G06F 13/362 710/116 |

* cited by examiner

*Primary Examiner* — Dong Kim
(74) *Attorney, Agent, or Firm* — Imperium Patent Works LLP; T. Lester Wallace; Mark D. Marrello (57) ABSTRACT

A high-speed credit-based allocator circuit receives an allocation request to make an allocation to one of a set of a processing entities. The allocator circuit maintains a chain of bubble sorting module circuits for the set, where each bubble sorting module circuit stores a resource value and an indication of a corresponding processing entity. A bubble sorting operation is performed so that the head of the chain tends to indicate the processing entity of the set that has the highest amount of the resource (credit) available. The allocation requested is made to the processing entity indicated by the head module circuit of the chain. The amount of the resource available to each processing entity is tracked by adjusting the resource values as allocations are made, and as allocated tasks are completed. The allocator circuit is configurable to maintain multiple chains, thereby supporting credit-based allocations to multiple sets of processing entities.

23 Claims, 9 Drawing Sheets

NETWORK APPLIANCE

INGRESS MAC ISLAND

FIG. 6

INGRESS NBI ISLAND

FIG. 7

| WIDTH | DESCRIPTION |
|---|---|
| 6-BITS | A PRECLASSIFIER CONTEXT NUMBER (USED BETWEEN PRECLASSIFIER AND ALLOCATOR CIRCUIT TO IDENTIFY THE PACKET). |
| 8-BITS | POINTER TO BEGINNING OF THE PACKET IN SRAM. |
| 14-BITS | LENGTH OF THE PACKET IN SRAM. |
| 32-BITS | SEQUENCE NUMBER IN A FLOW (USABLE TO ORDER PACKETS TO BE SENT OUT IB-NFP). |
| ~128-BITS | USER METADATA (A CODE INDICATIVE OF PACKET TYPE)<br>- THREE BITS INDICATE A SET OF ME ISLANDS TO USE (DETERMINED BY A PICOENGINE)<br>(ONE SET IS USED TO PROCESS EXCEPTION PACKETS, OTHER SETS ARE USED TO HANDLE FAST PATH PACKETS) |
| 1-BIT | VALID BIT. |

PRECLASSIFICATION RESULTS
(PART OF AN ALLOCATION REQUEST)

FIG. 8

| | |
|---|---|
| 5-BITS | REFERENCE NUMBER THAT IDENTIFIES THIS ALLOCATION COMMAND - WILL BE RETURNED LATER BACK TO THE ALLOCATOR CIRCUIT IN AN ALLOCATION RESPONSE. |
| 6-BITS | THE ME ISLAND TO WHICH THE ALLOCATION IS BEING MADE - THE ALLOCATION COMMAND IS SENT TO THIS ME ISLAND. |
| 2-BITS | SIZE OF THE ALLOCATION: 0=256 BYTES, 1=512 BYTES, 2=1K BYTES, 3=2K BYTES. THE PACKET ENGINE OF THE RECEIVING ME ISLAND USES THIS SIZE VALUE TO ALLOCATE MEMORY SPACE IN ITS CLUSTER TARGET MEMORY WHERE THE PACKET WILL BE RECEIVED. |

ALLOCATION COMMAND

FIG. 9

| WIDTH | DESCRIPTION |
|---|---|
| 5-BITS | REFERENCE NUMBER FROM AN ALLOCATION COMMAND - INDICATES A CORRESPONDING ALLOCATION COMMAND FOR WHICH THIS IS A RESPONSE. |
| 9-BITS | PACKET NUMBER (AN INDEX INTO THE PACKET ALLOCATION TABLE IN THE PACKET ENGINE, THAT TRANSLATES INTO AN ADDRESS FOR WHERE IN CTM OF THE ME ISLAND TO STORE AN INGRESS PACKET DESCRIPTOR AND THE FIRST PART OF A PACKET (FOR A TASK BEING ALLOCATED). |
| 11-BITS | PACKET CREDIT BEING RETURNED (DUE TO COMPLETION OF A PRIOR TASK). |
| 9-BITS | BUFFER CREDIT BEING RETURNED (DUE TO COMPLETION OF A PRIOR TASK). |

ALLOCATION RESPONSE

FIG. 11

| WIDTH | DESCRIPTION |
|---|---|
| 9-BITS | PACKET NUMBER - AN INDEX INTO THE PACKET ALLOCATION TABLE IN THE PACKET ENGINE, THAT TRANSLATES INTO AN ADDRESS FOR WHERE IN CTM OF THE ME ISLAND THE FIRST PART OF THE PACKET IS STORED. |
| 1-BIT | SPLIT BIT (INDICATES THAT THE PACKET WAS SPLIT BETWEEN THE CTM AND A MEMORY). |
| 2-BITS | NUMBER THAT IDENTIFIES WHICH BUFFER LIST WAS USED. |
| 6-BITS | ME ISLAND NUMBER THAT GOT THE ALLOCATION. |
| 29-BITS | ADDRESS INFO INDICATING WHERE THE SECOND PART OF THE PACKET IS STORED (IN INTERNAL SRAM OR IN EXTERNAL DRAM). |
| 14-BITS | PACKET LENGTH. |
| ~100-BITS | USER METADATA (A CODE INDICATIVE OF PACKET TYPE)<br>- THREE BITS INDICATE THE SET OF PROCESSING ENTITIES ALLOCATED THE TASK.<br>- ONE BIT INDICATES WHETHER THE PACKET IS AN EXCEPTION PACKET OR A FAST PATH PACKET.<br>- SEQUENCE NUMBER OF THE PACKET IN THE FLOW. |

INGRESS PACKET DESCRIPTOR
(SENT TO CTM OF ALLOCATED ME ISLAND ALONG WITH THE FIRST PART OF THE PACKET)

FIG. 12

ME ISLAND
FIG. 10

CREDIT-BASED RESOURCE ALLOCATOR CIRCUIT

TECHNICAL FIELD

The described embodiments relate generally to resource allocator circuits, and more particularly to high-speed credit-based resource allocator circuits in network appliances and to related methods.

BACKGROUND INFORMATION

In circuit design, a stream of tasks to be performed may be received, where execution of the tasks should be spread out among several processing entities. One of the processing entities may, for example, be specialized so that it performs a certain type of processing that the other processing entities do not perform. When an incoming task is received of the type performed by the processing entity, the task should be forwarded to the appropriate specialized processing entity. To perform this kind of allocation, an allocator should monitor incoming tasks to identify those tasks that are suitable for forwarding to particular processing entities according to the capabilities of the processing entities. In other situations, several processing entities may be equally suited to executing the same types of tasks, but some of the processing entities may become overburdened. To perform this kind of allocation, the allocator should perform a load balancing function so that the load of processing is spread more evenly across the processing entities. Several schemes, including round-robin or weighted round-robin schemes, exist for implementing load balancing. These schemes help ensure that the next task that is allocated is allocated to a processing entity that has processing throughput available.

SUMMARY

A high-speed credit-based resource allocator circuit includes a control circuit and multiple bubble sorting module circuits. The bubble sorting module circuits are configured to form one or more chains, where each chain corresponds to a set of processing entities. Each bubble sorting module in a chain corresponds to a different respective one of the processing entities of the corresponding set. Each chain has a head bubble sorting module circuit, and an end bubble sorting module circuit. Each bubble sorting module circuit stores a resource value and a processing entity value, where the processing entity value indicates one of the processing entities, and where the resource value indicates the amount of a resource that the indicated processing entity has available.

In a simplified explanation of a bubble sorting operation, a bubble sorting module circuit (except for the head bubble sorting module circuit of a chain) compares its stored resource value with the resource values stored by the bubble sorting module to its left. If the resource value stored by the bubble sorting module circuit is greater (according to a rule) than the resource value stored by the bubble sorting module circuit to the left, provided that the bubble sorting module to the left is in the same chain, then the two bubble sorting modules swap resource values and their stored processing entity values. This comparing (using the rule), following by swapping if appropriate, occurs multiple times so that a bubble sort operation is carried out on the bubble sorting module circuits of the chain. The leftmost "head" bubble sorting module circuit of the chain therefore tends to have the highest resource value of the chain. The processing entity value stored in the head indicates which processing entity it is that amount of the resource.

In a method of operation, an allocation request message is received onto the allocator from a requesting entity, where the allocation request identifies one of the sets of processing entities, but does not indicate which particular one of the processing entities of the set it is that is to be allocated the task. The control circuit of the allocator circuit receives the allocation request, and from the indicated set in the allocation request, identifies the head of the chain of bubble sorting module circuits associated with the set. The stored processing entity value stored by the head is determined to indicate the processing entity to which the allocation will be made. After the allocation determination is made, the resource values of the bubble sorting module circuits are adjusted. The amount of the resource to be allocated as indicated in the allocation request is decremented from the resource values of any bubble sorting module circuits whose processing entity values indicate the processing entity to which the allocation was made. An allocation command is then output, where the allocation command indicates the processing entity to which the allocation was made and also indicates the amount of the resource being allocated.

After the handling of the incoming allocation request and after the allocation determination (of the processing entity to which the allocation is made) has been made, and after the resource values have been adjusted as appropriate, then the bubble sorting module circuits undergo another bubble sorting phase. The bubble sorting phase is then followed by another output determining phase in which another allocation request can be handled and another adjustment of the resource values can be made. In this way, the allocator circuit operates in alternating output determining and bubble sorting phases.

In the meantime, the processing entity to which the task was allocated performs the task. When the task is complete, the processing entity returns an allocation response message back to the allocator circuit. The allocation response indicates the processing entity that has just completed its task, and also indicates the amount of previously allocated resource that is no longer needed for performing the now completed task. The allocator circuit receives the allocation response, and in the next output generating phase the allocator circuit increments the resource value of any bubble sorting module circuit whose processing entity value indicates that the module circuit stores a resource value for the processing entity that returned the allocation response. This is a somewhat simplified explanation in that in some examples a pending allocation request and a pending allocation response can both be handled at the same time in the same output generation phase, such that the amount resource values are adjusted is the difference between the amount of the resource being newly allocated and the amount of the resource being freed up due to a previously allocated task having been completed.

As the allocator circuit operates, for each set, the head bubble sorting module circuit tends to store the processing entity value of the processing entity of the set that has the most of the resource available (has the most credit). In response to an incoming allocation request to allocate a task to one of the processing entities of a set, the control circuit consults the head bubble sorting module circuit of the appropriate chain (the chain that stores information for the set), and from that head bubble sorting module circuit determines the processing entity to which the allocation will be made. The allocation is therefore usually made to the processing entity of the set that has the most of the resource available (has the most credit). As tasks are allocated, and as tasks are completed, the resource values stored in the various bubble sorting module circuits are adjusted so that the resource values track the actual amount of the resource each processing entity has available.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a table that sets forth fields of an allocation command.

FIG. 11 is a table that sets forth fields of an allocation response message that is passed from the ME island of FIG. 10 to the ingress NBI island of FIG. 7.

FIG. 12 is a table that sets forth fields of an ingress packet descriptor that is passed from the ingress NBI island of FIG. 7 to the ME island of FIG. 10.

DETAILED DESCRIPTION

Reference will now be made in detail to some embodiments of the invention, examples of which are illustrated in the accompanying drawings.

Figure 1:
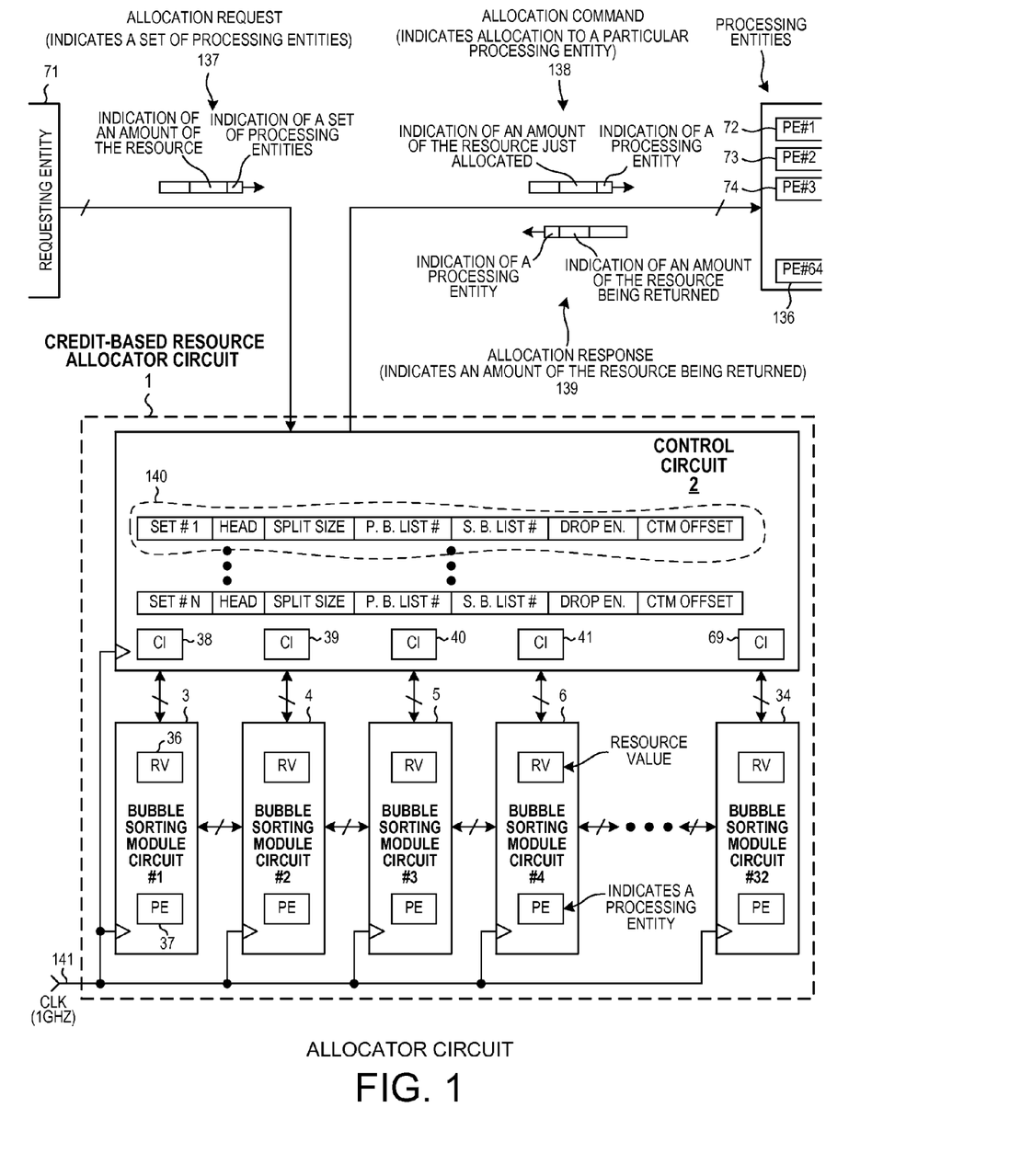
FIG. 1 is a diagram of a credit-based allocator circuit 1 in accordance with one novel aspect.

FIG. 1 is a diagram of a resource allocator circuit 1 in accordance with one novel aspect. Resource allocator circuit 1 includes a control circuit 2 and thirty-two bubble sorting module circuits 3-34. The bubble sorting module circuits are all identical to one another. The bubble sorting module circuits are logically organized in a row as shown. The bubble sorting module circuits do not include any general purpose processor that fetches instructions from a memory and that decodes and executes instructions, nor do the bubble sorting module circuits access a memory or maintain any linked lists. Rather, the bubble sorting module circuits are realized entirely in the form of high-speed combinatorial logic and dedicated state machines.

In addition to the allocator circuit 1, there is also a requesting entity 71 and a plurality of associated processing entities 72-136. In one example, each of the sixty-four processing entities is digital processor that is programmed to perform a particular type of processing. Each processing entity has available to it, or includes, a certain amount of a "resource".

The "resource" may, for example, be an amount of memory space into which data to be processed can be placed. When a processing entity is assigned a task to perform as a result of the allocator circuit 1 issuing an allocation command, a certain amount of the resource of the processing entity is reserved for carrying out the task. When the processing entity then completes the task, the amount of the resource that was reserved is then freed up for use in carrying out another task. An allocation response is returned to the allocator circuit to indicate that the processing entity has this additional amount of freed up resource. As the allocator circuit 1 operates, it keeps track of the current unreserved amount of the resource that each processing entity has available.

Within the allocator circuit, each bubble sorting module circuit stores a "resource value" (RV) and an "indication of a processing entity" (PE). For example, resource value 36 is a value stored by module 3 that indicates the amount of the resource that the particular processing entity identified by the PE 37 has available.

If appropriately configured, a bubble sorting module circuit can exchange (referred to here as "swapping") information with the bubble sorting module circuits to its left or to its right. The bubble sorting module circuit 3 at the leftmost end of the row has no bubble sorting module circuit to its left so it cannot exchange information with a module to its left. Similarly, the bubble sorting module circuit 34 at the rightmost end of the row has no bubble sorting module circuit to its right so it cannot exchange information with a module to its right. For each bubble sorting module circuit, the control circuit 2 stores an amount of configuration information. In FIG. 1, the blocks 38-69 labeled "CI" identify registers that store such configuration information. The configuration information for a bubble sorting module circuit defines the module to belong to a particular set of bubble sorting modules, where the modules of the set are contiguous and logically organized to be adjacent to one another in what is referred to here as a "chain". The configuration information for a bubble sorting module also includes a "chain end flag". When set, the chain end flag identifies the corresponding bubble sorting module circuit to be the last bubble sorting module circuit of a chain. There are one or more bubble sorting module circuits in each chain. Typically, the bubble sorting module circuits of the row are configured so that the row includes several such chains. Such a chain of bubble sorting module circuits contains information about a corresponding set of the processing entities. The leftmost bubble sorting module circuit of each chain is said to be the "head" of the chain. In addition, for each "set" number the control circuit stores: 1) a number that identifies which bubble sorting module circuit it is that is the "head" of the chain for the set, 2) a split size number, 3) a number that identifies a primary buffer list, 4) a number that identifies a secondary buffer list, 5) a drop enable bit (if there are no credits at the head, this bit determines whether to wait or to drop), and 6) a CTM offset (an offset that indicates where to start writing the data into the target processing entity). In the illustration of FIG. 1, these configuration values for set number one are shown circled by dashed line 140. Such a "set" of processing entities is also referred to as a "group" of processing entities, or a "pool" of processing entities.

The bubble sorting module circuits of a chain undergo bubble sorting operations. In a compare and arbitration step of a bubble sorting operation, a bubble sorting module circuit compares its resource value with the resource value stored by the bubble sorting module circuit to the left, provided that neighboring left circuit is of the same set (same "chain"). If the resource value of the bubble sorting module circuit to the left is smaller than the resource value stored by the bubble sorting module circuit, then the bubble sorting module circuit asserts a left swap request signal that is supplied to the bubble sorting module circuit to the left.

Swap arbitration then occurs. If a requesting bubble sorting module circuit asserts a left swap request signal to the bubble sorting module circuit to its left, and if the requesting bubble sorting module circuit is also receiving a swap request from the bubble sorting module circuit to its right, and if the bubble sorting module circuits to the left and right are both in the same set, then the requesting bubble sorting module circuit deasserts its left swap request signal if the requesting bubble sorting module circuit has an odd number. A "chain end flag" that is set disables any incoming swap request from the right, thereby preventing the bubble sorting module circuit at the right end of the chain from swapping with its right neighbor.

After the swap request signals have settled in the compare/arbitration step, each bubble sorting module circuit that is still asserting a left swap request signal to another bubble sorting circuit to its left that is of the same set undergoes a swap operation. A swap operation results in both the resource value (RV) and the indication of the processing entity (PE) of the two neighboring bubble sorting module circuits being swapped. After the swap step occurs, and second compare and arbitration step occurs. After the second compare and arbitration step occurs, then a second swap step occurs. After two pairs of compare/arbitration and swapping steps occur, the leftmost bubble sorting module circuit either has the highest resource value of the set (of the chain) or has one of the highest resource value of the set (of the chain). The bubble sorting module circuits of each set (of each chain) repeatedly perform these bubble sorting steps.

In one example, the bubble sorting steps are only performed once following handling of either an allocation request or an allocation response. In other examples, the bubble sorting steps are performed two or more times following each handling of an allocation request or an allocation response.

The overall allocator circuit 1 operates in what are referred to as "phases". There is an output determining phase and a bubble sorting phase. Each bubble sorting phase is followed by an output determining phase, and each output determining phase is followed by a bubble sorting phase, and so forth in alternating fashion.

The control circuit 2 receives an allocation request from the requesting entity. By sending the allocation request, the requesting entity seeks to assign a task to a set of processing entities, but the requesting entity leaves it up to the allocator circuit to determine which particular one of the processing entities of the set will be tasked with carrying out the task. The requesting entity specifies the set, and the amount of the resource required, but does not indicate the particular processing entity that will be allocated the task to perform. In one example, the allocator circuit 1 receives an allocation request 137 from the requesting entity, where the allocation request 137 includes: 1) an indication of a set of processing entities, and 2) an amount of resources that handling the request will require.

Next, in an output determining phase, the control circuit 2 determines, for the set indicated by the allocation request, the particular processing entity whose PE value is stored by the bubble sorting module circuit at the head of the chain (the chain of bubble sorting module circuits for the specific set of processing entities indicated by the allocation request). The indication of the set from the incoming allocation request is used by the control circuit 2 to identify the correct "head" bubble sorting module circuit, and it is the PE value stored that is determined to be the particular processing entity value determined by the output determining phase.

As a result of the control circuit 2 making this determination, the allocator circuit 1 outputs an allocation command 138, where the allocation command 138 indicates: 1) the processing entity to which the allocation is being made, and 2) an amount of the resource to consume in performing the task associated with the allocation request. The resource value for the determined particular processing entity is then decremented by the amount of the resource. There may be multiple bubble sorting module circuits whose PE values identify the particular processing entity. The RV values of all of these bubble sorting module circuits are adjusted (decremented in this case) at the same time in the same way.

Next, in a following bubble sorting phase, the bubble sorting module circuits of each set (of each chain) perform swap operations. As set forth above, the swap operation involves a compare/arbitration step, followed by a swap step, followed by a second compare/arbitration step, and followed by a second swap step. After the bubble sorting phase, there is another output determining phase. In this way, the allocator circuit 1 cycles between output determining phases and bubble sorting phases.

When the processing entity determined by the output determining phase receives the allocation command, it performs the allocated task. The specified amount of the resource is allocated for use in performing the task. In one specific example, the task is initiated by placing data to be processed into a memory of the specified processing entity. This signals the processing entity to start performing the task.

When the processing entity completes the task, the amount of the resource that was reserved for use in performing the task is then freed up for use in performing another task. An allocation response 139 is therefore returned to the allocator circuit (as a part of an allocation response to another allocation command). The allocation response 139 indicates the amount of the resource that has been freed up for use in carrying out another task. In the next output determining phase, when the RV values of the bubble sorting module circuits are adjusted, the RV values for the processing entity that returned the allocation response are then adjusted (in this case incremented) by the amount of the resource that was freed up due to the task having been completed. The incrementing of the RV values records that the processing entity now has more of the resource available for future allocation. The RV value of every bubble sorting module circuit whose PE indicates the processing entity (the processing entity that returned the allocation response) is incremented simultaneously by the same amount.

Figure 2:
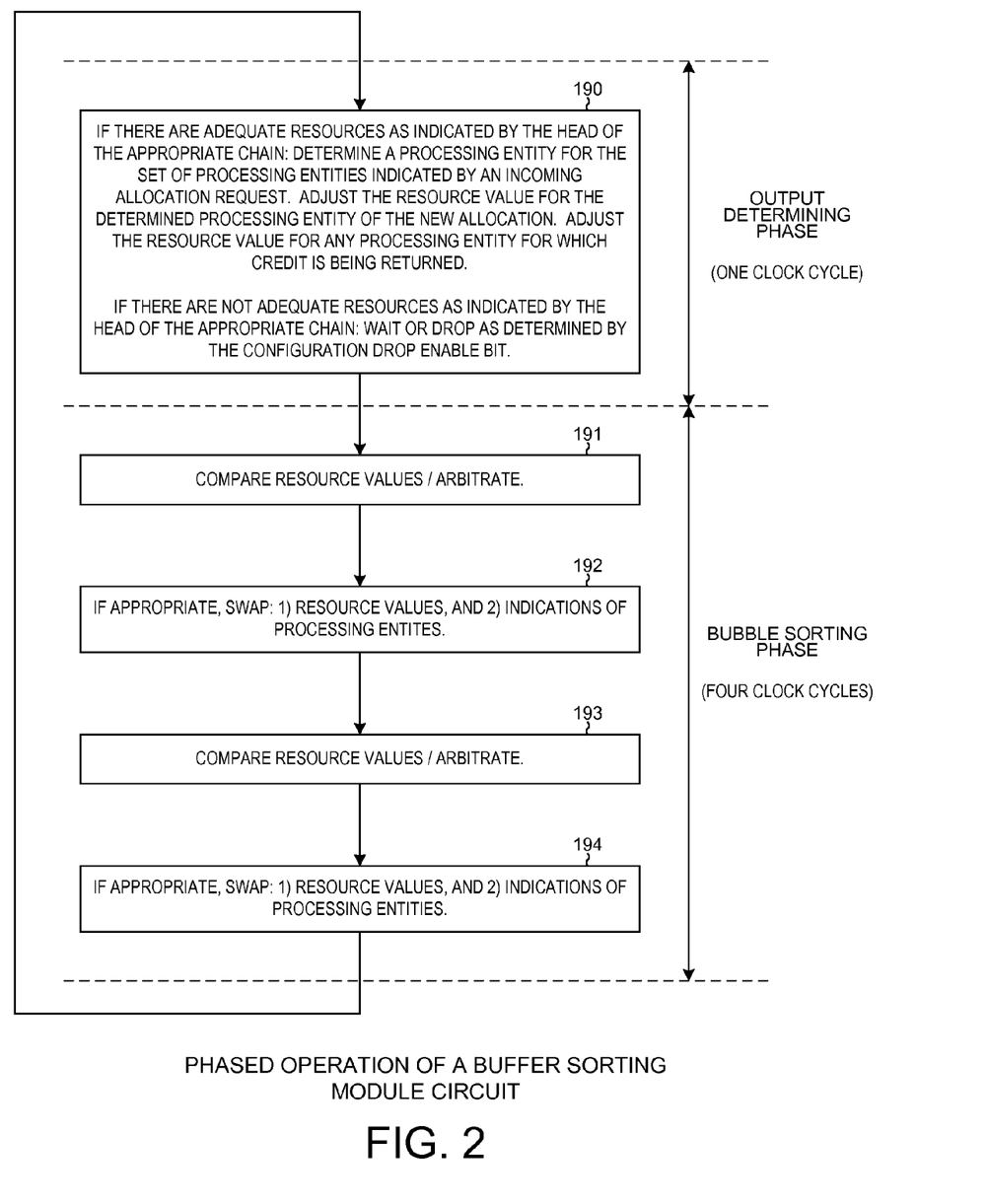
FIG. 2 is a flowchart that illustrates how the allocator circuit 1 of FIG. 1 operates in alternating output determining and bubble sorting phases.

FIG. 2 is a diagram that illustrates how the allocator circuit 1 operates in alternating output determining phases and bubble sorting phases. In an output determining phase (step 190), the control circuit 2 determines a processing entity for the set indicated by an allocation request. The determination is made by identifying the "head" bubble sorting module circuit of the chain that corresponds to the set, and then picking the processing entity indicated by the PE value of that bubble sorting module circuit to be the determined processing entity. The resource value of the head bubble sorting module circuit is then adjusted (in this case decremented) to reflect that the allocation has been made and that the corresponding processing entity now has less of the resource available for future allocations. The resource values of all modules whose PE values indicate the processing entity are adjusted at the same time, not just the resource value of the head module of the set. The outputting of an allocation command is then initiated such that the processing entity to which the task has been allocated will begin performing the task, and such that the processing entity will use the allocated amount of the resource to carry out the task. The actual sending of the allocation command need not occur in the output determining phase, however, but rather typically occurs a few clock cycles later.

After the output determining phase, the allocator circuit 1 operates in a bubble sorting phase. As indicated (steps 191-194) in FIG. 2, the bubble sorting module circuits of a set compare their stored resource values with their neighbors of the chain for the set, and if appropriate exchange resource values and indications of processing entities. In the specific example of FIG. 2, this occurs twice in that there is a first compare/arbitration step, followed by a first swap step, followed by a second compare/arbitration step, followed by second swap step. The bubble sorting phase lasts for four clock cycles. During a bubble sorting phase, an allocation request can be received by the control circuit, but it will not be acted upon by the control circuit until the next output determining phase. Likewise the allocator circuit can receive an allocation response, but the allocation response will not be acted upon by the control circuit until the next output determining phase. Allocation decisions are only made, and RV values are only adjusted, during output determining phases.

Figure 3:
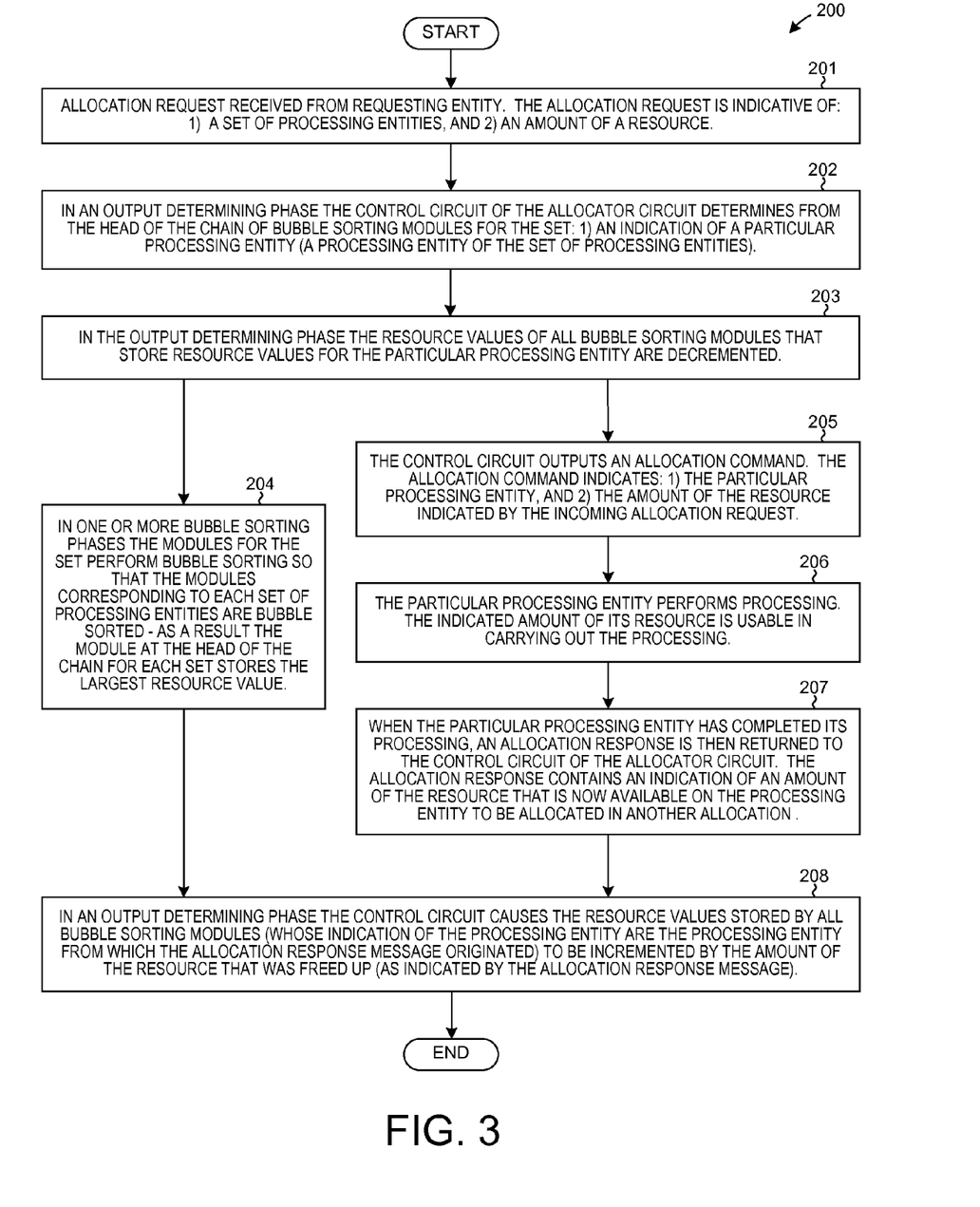
FIG. 3 is a flowchart that illustrates an operation of the allocator circuit 1 of FIG. 1.

FIG. 3 is a flowchart of an example of an operational method 200 of the allocator circuit 1 of FIG. 1. An allocation request is received (step 201) from a requesting entity. The allocation request is indicative of: 1) a set of processing entities, and 2) an amount of a resource (for example, the amount of the resource required to carry out a task associated with the allocation request). In an output determining phase, the control circuit uses the indicated set to determine (step 202) the head of the chain for that set. The processing entity indicated by the PE of the head is then the determined processing entity to which the task will be allocated. The resource values of bubble sorting modules are then adjusted if appropriate. In the case where the only adjustment is due to the allocation request just received, the adjustment is a decrementing of the resource values of all bubble sorting modules that processing entity values indicate the particular processing entity determined (in step 202). The resource values are decremented by the amount of the resource value allocated. In one or more bubble sorting phases, the modules for the set undergo bubble sorting (step 204) so that the modules corresponding to each set of processing entity are bubble sorted. Each bubble sorting phase is followed by an output determining phase, so if there are multiple bubble sorting phases then there are also intervening output determining phases. As a result of the bubble sorting phases, the head of the chain for each set generally stores the largest resource value of any module of the chain.

Independently of the bubble sorting of step 204, and simultaneously with the bubble sorting of step 204, steps 205-207 occur. In step 205, after the processing entity to which the task will be allocated has been determined (in step 202) and after the resource values have been adjusted as appropriate (in step 203), the control circuit outputs an allocation command (step 205). The result of the allocation command being output is that the particular processing entity is assigned the task and the amount of the resource is allocated. In one example, the allocation command is sent to the processing entity. The allocation command is indicative of: 1) the amount of the resource indicated by the incoming allocation request, and 2) the particular processing entity to which the task is being allocated.

The allocation command may be sent to the processing entity either directly, or indirectly. The allocation command may be sent in a plurality of communications between the allocator circuit and the processing entity. In one example, the allocation command does not itself contain an indication of the processing entity being assigned the task, but rather the allocation command is sent to the processing entity and the processing entity determines, by virtue of having received the allocation command, that it is the targeted processing entity being assigned the task.

Next, the processing entity performs the task (step 206) or causes the task to be performed. The amount of the resource allocated is available for use in carrying out the task. When the task has been completed, the processing entity returns an allocation response (step 207). The allocation response is received by the control circuit of the allocator circuit. The allocation response includes an indication of an amount of the resource that is now freed up for use in a future allocation. As explained above, if the allocation response is received during a bubble sorting phase, then the allocation response is not acted upon until the next output determining phase. In the next output determining phase, the control circuit causes the resource values stored by all bubble sorting module circuits (whose indications of the processing entity are the processing entity from which the allocation response originated) to be adjusted (step 208) by the amount of the resource indicated by the allocation response message.

Although not evident in the scenario of the method 200 of FIG. 3, it is possible that an incoming allocation request can result in an amount of the resource being decremented in the same output determining phase that a returned amount of the resource results in the same resource value is being incremented. In such a case, the difference between the amount to be incremented and the amount to be decremented is added to the appropriate resource values. As allocations are made to the processing entities, and as the processing entities complete their tasks, the corresponding resource values go up and down in magnitude. It is also possible that adjustments to resource values for multiple different processing entities might be made at the same during the same output determining phase. An allocation can be made once every five clock cycles of the 1 GHz clock signal received in input conductor 141.

In one example, the control circuit 2 and the bubble sorting module circuits 3-34 are designed by describing their respective functions in a hardware description language, and then using a commercially available hardware synthesis program to generate an integrated circuit layout. A commercial semiconductor integrated circuit fabrication house then uses the integrated circuit layout to fabricate an integrated circuit that includes the allocator circuit 1 in hardware form. In the presently described example, the allocator circuit 1 includes no processor that fetches general purpose instructions from a memory, decodes the instructions, and executes the instructions, but rather the allocator circuit 1 is realized entirely as combinatorial logic and high-speed dedicated state machines. The allocator circuit 1 clocks at 1 GHz.

The allocator circuit 1 is not limited to receiving the allocation request by any particular communication mechanism or format or protocol, nor is the allocator circuit 1 limited to require the allocation command or the allocation response to use any particular communication mechanism or format or protocol. Allocation requests, allocation commands, and allocation responses can be communicated across the same bus, or across multiple different buses. The amount of the resource tracked by a bubble sorting module circuit can be an amount of memory space, an amount of processing, an amount of communication throughput, an amount of power, or an amount of any other quantifiable resource, the usage or consumption of which can be monitored and regulated. The resource tracked can be one such resource, or can be a combination of multiple resources.

Specific Example in a Network Appliance

Figure 4:
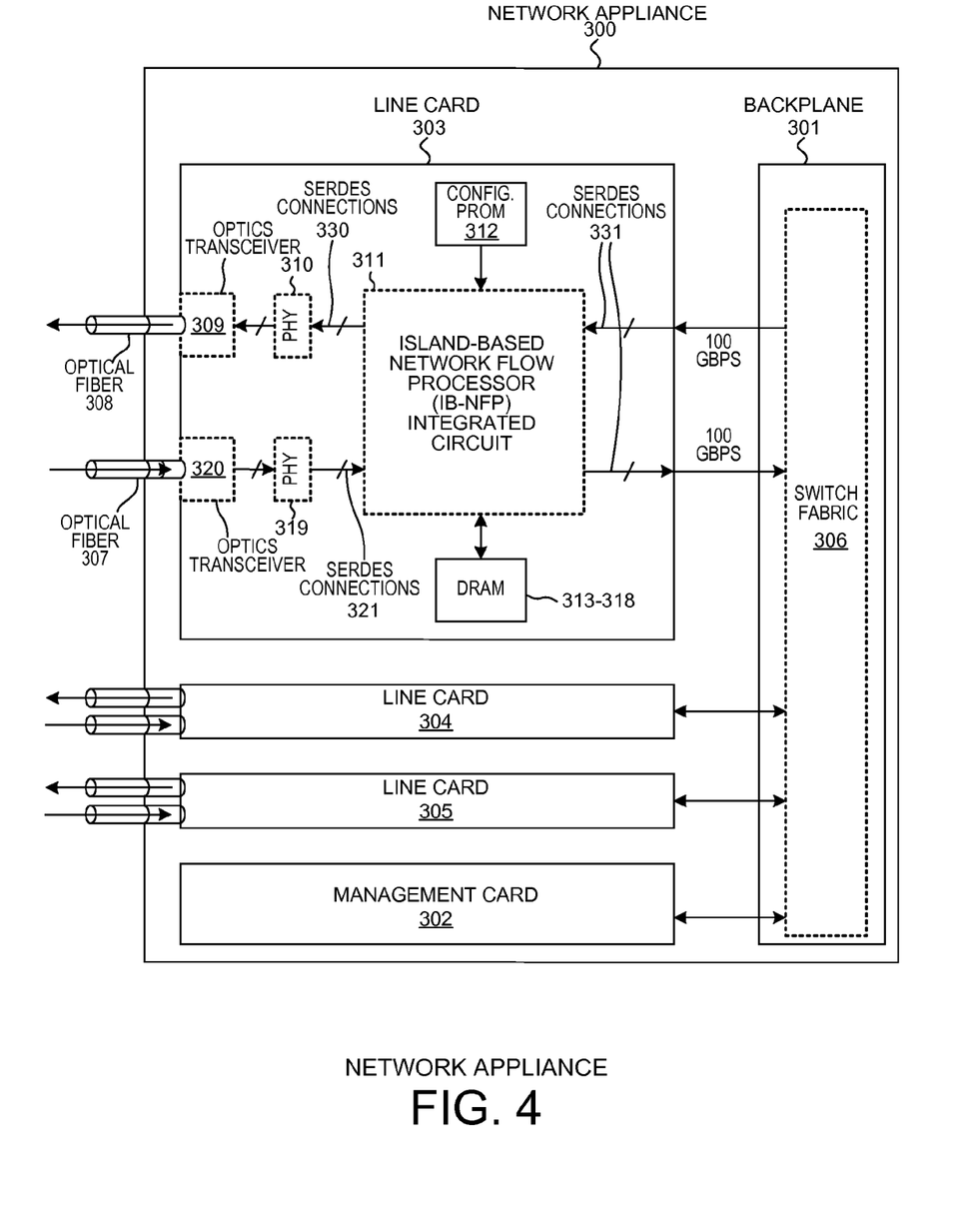
FIG. 4 is a diagram of network appliance 300 in which a specific example of the novel credit-based allocator circuit operates.

FIG. 4 is a diagram of a network appliance 300 within which a specific embodiment of the allocator circuit operates. The allocator circuit is described generally in connection with FIG. 1, whereas a specific example of the allocator circuit is described in connection with network appliance 300.

Network appliance 300 includes a backplane 301, a management card 302, and line cards 303-305. Each of the line cards can receive 100 Gbps (gigabits per second) packet traffic from another network via a fiber optic cable and also can transmit 100 Gbps packet traffic to another network via another fiber optic cable. In addition, each line card can receive 100 Gbps packet traffic from the switch fabric 306 of the backplane and can also transmit 100 Gbps packet traffic to the switch fabric. The line cards are of identical construction. In this example, flows of packets are received into line card 303 from a network via the fiber optic cable 307 or from the switch fabric 306. Certain functions then need to be performed on the line card including determining destinations for incoming flows of packets, and scheduling the transmitting of flows of packets. Packets of the flows pass from the line card 303 and out either to the network via optical cable 308 or to the switch fabric 306.

Exemplary line card 303 includes a first optical transceiver 309, a first PHY integrated circuit 310, an Island-Based Network Flow Processor (IB-NFP) integrated circuit 311, a configuration Programmable Read Only Memory (PROM) 312, an external memory such as Dynamic Random Access Memory (DRAM) 313-318, a second PHY integrated circuit 319, and a second optical transceiver 320. Packet data received from the network via optical cable 307 is converted into electrical signals by optical transceiver 320. PHY integrated circuit 319 receives the packet data in electrical form from optical transceiver 320 and forwards the packet data to the IB-NFP integrated circuit 311 via SerDes connections 321. In one example, the flows of packets into the IB-NFP integrated circuit 311 from optical cable 307 is 100 Gbps traffic. A set of four SerDes circuits 322-325 (see FIG. 5) within the IB-NFP integrated circuit 311 receives the packet data in serialized form from SerDes connections 321, deserializes the packet data, and outputs packet data in deserialized form to digital circuitry within IB-NFP integrated circuit 311.

Similarly, IB-NFP integrated circuit 311 may output 100 Gbps packet traffic to optical cable 308. PHY 310 receives the serialized form packet data via SerDes connections 330 and supplies the packet data to optical transceiver 309. Optical transceiver 309 converts the packet data into optical form and drives the optical signals through optical cable 308.

IB-NFP integrated circuit 311 can also output packet data to switch fabric 306. Another set of four duplex SerDes circuits 326-329 within IB-NFP integrated circuit 311 receives the packet data in deserialized form, and serializes the packet data, and supplies the packet data in serialized form to switch fabric 306. Packet data from switch fabric 306 in serialized form can pass from the switch fabric via SerDes connections 331 into the IB-NFP integrated circuit 311 and to the set of four SerDes circuits 326-329. SerDes circuits 326-329 convert the packet data from serialized form into deserialized form for subsequent processing by digital circuitry within the IB-NFP integrated circuit 311.

Management card 302 handles appliance management functions including the configuring of the IB-NFP integrated circuits on the various line cards. The CPU of the management card communicates with the IB-NFP integrated circuits via dedicated PCIE connections (not shown).

Figure 5:
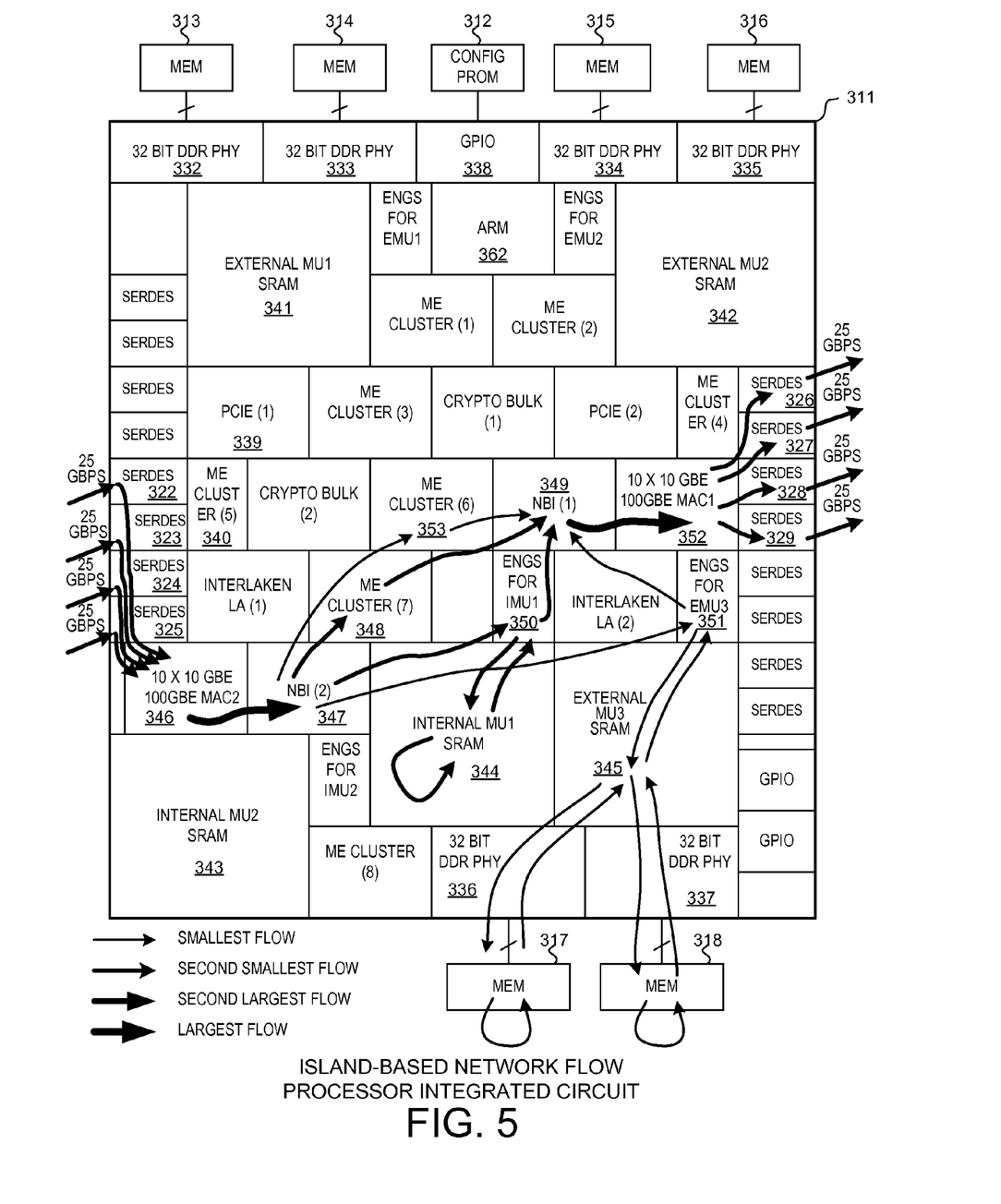
FIG. 5 is a diagram that shows how information flows through the IB-NFP integrated circuit 311 of line card 303 of the network appliance 300 of FIG. 4.

FIG. 5 is a more detailed top-down diagram of IB-NFP integrated circuit 311. SerDes circuits 322-325 are the first set of four SerDes circuits that are used to communicate with the external network via the optical cables 307 and 308. SerDes circuits 326-329 are the second set of four SerDes circuits that are used to communicate with the switch fabric 306. Each of these SerDes circuits is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 311 accesses external memory integrated circuits 313-318 via corresponding 32-bit DDR physical interfaces 332-337, respectively. IB-NFP integrated circuit 311 also has several general purpose input/output (GPIO) interfaces. One of these GPIO interfaces 338 is used to access external configuration PROM 312.

In addition to the area of the input/output circuits outlined above, the IB-NFP integrated circuit 311 also includes two additional areas. The first additional area is a tiling area of islands. Each of the islands is either of a full rectangular shape, or is half the size of the full rectangular shape. For example, the island 339 labeled "PCIE (1)" is a full island. The island 340 below it labeled "ME CLUSTER (5)" is a half island. The functional circuits in the various islands of this tiling area are interconnected by: 1) a configurable mesh CPP data bus, 2) a configurable mesh control bus, and 3) a configurable mesh event bus. Each such mesh bus extends over the two-dimensional space of islands with a regular grid or "mesh" pattern. In addition to the tiling area, there is also a second additional area of larger sized blocks 341-345 of circuitry.

FIG. 5 illustrates, with arrows, an operational example of how data passes through the IB-NFP integrated circuit 311. 100 Gbps packet traffic is received via optical cable 307 (see FIG. 4), flows through optics transceiver 320, flows through PHY integrated circuit 319, and is received onto IB-NFP integrated circuit 311 spread across the four SerDes I/O blocks 322-325. The symbols pass through direct dedicated conductors from the SerDes blocks 322-325 to ingress MAC island 346. Ingress MAC island 346 converts successive symbols delivered by the physical coding layer into packets by mapping symbols to octets, by performing packet framing, and then by buffering the resulting packets for subsequent communication to other processing circuitry. The packets are communicated from ingress MAC island 346 across a private inter-island bus to ingress NBI (Network Bus Interface) island 347.

For each packet, the functional circuitry of ingress NBI island 347 examines fields in the header portion to determine what storage strategy to use to place the packet into memory. In one example, the NBI island 347 examines the header portion and from that determines whether the packet is an exception packet or whether the packet is a fast-path packet. If the packet is an exception packet then the NBI island 347 determines a first storage strategy to be used to store the packet so that relatively involved exception processing can be performed efficiently, whereas if the packet is a fast-path packet then the NBI island 347 determines a second storage strategy to be used to store the packet for more efficient transmission of the packet from the IB-NFP.

In the operational example of FIG. 5, NBI island 347 examines a packet header, performs packet preclassification, determines that the packet is a fast-path packet, and determines that the header portion of the packet should be placed into a CTM (Cluster Target Memory) in ME (Microengine) island 348. The header portion of the packet is therefore communicated across the configurable mesh data bus from NBI island 347 to ME island 348. The ME island 348 determines header modification and queuing strategy for the packet based on the packet flow (derived from packet header and contents) and the ME island 348 informs an egress NBI island 349 of these. In this simplified example being described, the payload portions of fast-path packets are placed into internal SRAM (Static Random Access Memory) MU block 344. The header portions of exception packets are placed into a CTM in ME island 353, and the payload portions of exception packets are placed into external DRAM 317 and 318.

Half island 350 is an interface island through which all information passing into, and out of, SRAM MU block 344 passes. The functional circuitry within half island 350 serves as the interface and control circuitry for the SRAM within block 344. Accordingly, the payload portion of the incoming fast-path packet is communicated from ingress NBI island 347, across the configurable mesh data bus to SRAM control island 350, and from control island 350, to the interface circuitry in block 344, and to the internal SRAM circuitry of block 344. The internal SRAM of block 344 stores the payloads so that they can be accessed for flow determination by the ME island.

In addition, a preclassifier in the ingress NBI island 347 determines that the header portions of exception packets are into a CTM in ME island 353, and the payload portions of exception packets should be stored in external DRAM 317 and 318. Interface island 351, block 345, and DDR PHY I/O blocks 336 and 337 serve as the interface and control for external DRAM integrated circuits 317 and 318. The payload portions of the exception packets are therefore communicated across the configurable mesh data bus from ingress NBI island 347, to interface and control island 351, to block 345, to 32-bit DDR PHY I/O blocks 336 and 337, and to external DRAM integrated circuits 317 and 318. At this point in the operational example, the packet header portions and their associated payload portions are stored in different places. The payload portions of fast-path packets are stored in internal SRAM in MU block 344, whereas the payload portions of exception packets are stored in external SRAM in external memories 317 and 318.

For fast-path packets, ME island 348 informs egress NBI island 349 where the packet headers and the packet payloads can be found and provides the egress NBI island 349 with an egress packet descriptor for each packet. The egress packet descriptor indicates a queuing strategy to be used on the packet. Egress NBI island 349 uses the egress packet descriptor to read the packet headers and any header modification from ME island 348 and to read the packet payloads from either internal SRAM 344 or external DRAMs 317 and 318. Similarly, for exception packets, ME island 353 informs NBI island 249 where the headers and packet payloads of exception packets are found.

Egress NBI island 349 places packet descriptors for packets to be output into the correct order. For each packet that is then scheduled to be transmitted, the egress NBI island 349 uses the packet descriptor to read the header portion and any header modification and the payload portion and to assemble the packet to be transmitted. Note that the header modification is not actually part of the egress packet descriptor, but rather it is stored with the packet header by the ME when the packet is presented to the egress NBI island 349. The egress NBI island 349 then performs any indicated packet modification on the packet. The resulting modified packet then passes from egress NBI island 349 and to egress MAC island 352.

Egress MAC island 352 buffers the packets, and converts them into symbols. The symbols are then delivered by conductors from egress MAC island 352 to the four SerDes I/O blocks 326-329. From SerDes I/O blocks 326-329, the 100 Gbps outgoing packet flow passes out of the IB-NFP integrated circuit 311 and across SerDes connections and to switch fabric 306. For additional details on IB-NFP 311, and on a network device that includes IB-NFP 311, see: U.S. patent application Ser. No. 13/399,324, by Gavin J. Stark, entitled "Configurable Mesh Data Bus In An Island-Based Network Flow Processor", filed Feb. 17, 2012 (the entire subject matter of which is incorporated herein by reference).

Figure 6:
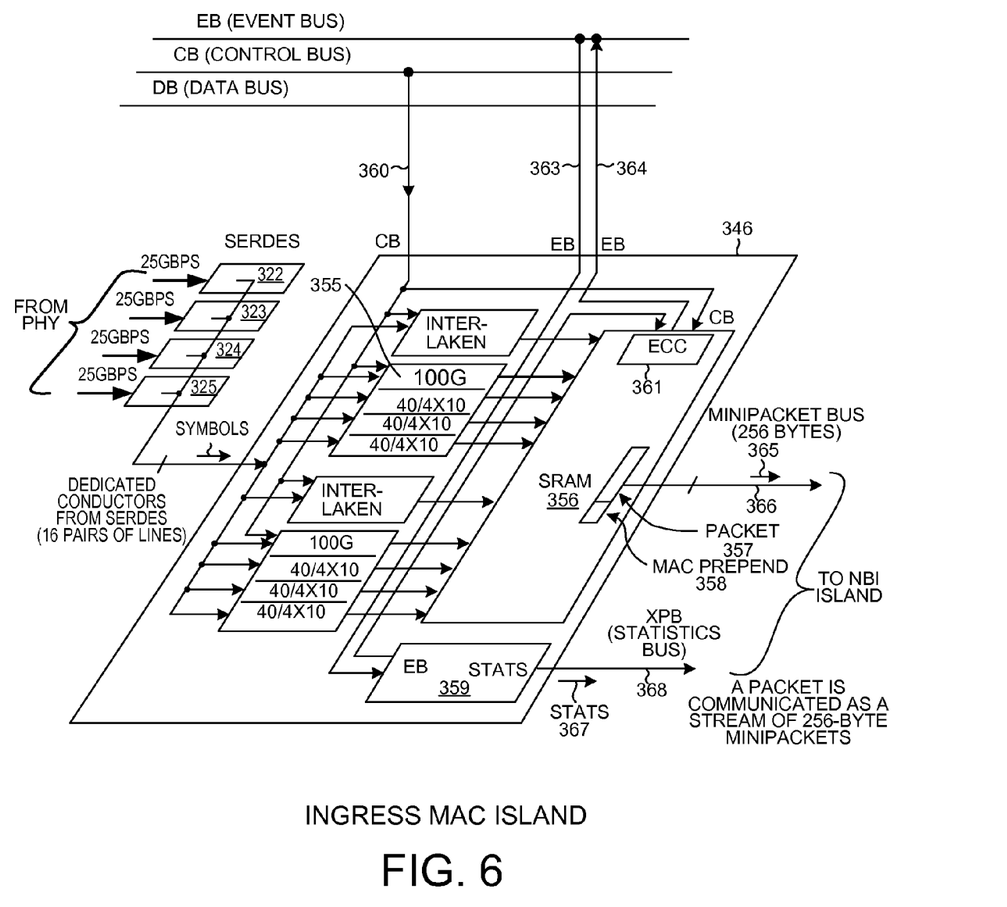
FIG. 6 is a diagram of the ingress MAC island 346 of the IB-NFP integrated circuit 311 of FIG. 5.

FIG. 6 is a more detailed diagram of the four SerDes I/O blocks 322-325 and the ingress MAC island 346. The symbols pass from the four SerDes I/O blocks and to the ingress MAC island across dedicated conductors. The symbols are converted into packets by a 100 Gbps ethernet block 355. The 100 Gbps ethernet block 355 analyzes the packets and places the results in this analysis at the beginning of the packet in the form of a "MAC prepend" value. The resulting packets and associated MAC prepend values are then buffered in SRAM 356. Reference numeral 357 identifies a part of the block that represents one packet and reference numeral 358 identifies a part of the block that represents the MAC prepend value. The MAC prepend value 358 includes: 1) an indication of the length of the packet, 2) an indication whether the packet is an IP packet, 3) and indication of whether the checksums are correct, and 4) a time stamp indicating when the packet was received.

As packets are loaded into SRAM 356, a statistics block 359 counts the number of packets that meet certain criteria. Various sub-circuits of the ingress MAC island are configurable. The input conductors 360 labeled CB couples the certain portions of the MAC island to the control bus. SRAM block 356 includes error detection and correction circuitry (ECC) 361. Error information detected and collected by ECC block 361 and statistics block 359 is reported through the local event bus and global event chain back to the ARM island 362. Ingress MAC island 346 is part of a local event ring. Event packets are circulated into the MAC island via conductors 363 and are circulated out of the MAC island via conductors 364. Packets that are buffered in SRAM 356 are then output from the MAC island to the ingress NBI island 347 in the form of one or more 256 byte minipackets 365 communicated across dedicated connections 366. Statistics information 367 is also communicated to the ingress NBI island 347 via dedicated connections 368.

Figure 7:
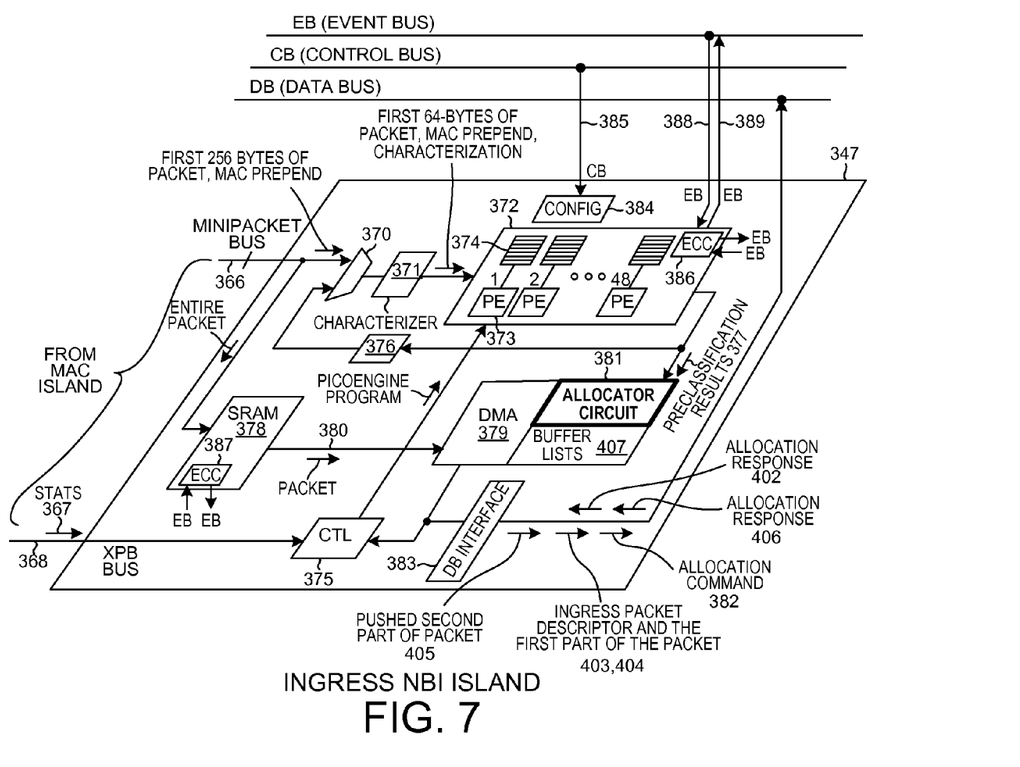
FIG. 7 is a diagram of the ingress NBI island 347 of the IB-NFP integrated circuit 311 of FIG. 5.

FIG. 7 is a diagram of ingress NBI island 347. For an incoming packet, the ingress NBI island 347 receives the MAC prepend and the minipackets via dedicated connections 366 from the ingress MAC island 346. The entire packet written into SRAM 378. The first 256 bytes of the packet and the MAC prepend pass through multiplexing circuitry 370 and to a characterizer 371. Characterizer 371 outputs characterization information, the first sixty-four bytes of the packet, and the MAC prepend. This is passed to a pool 372 of forty-eight picoengines. Each picoengine (PE) executes a program stored in an associated instruction control store. Reference numeral 373 identifies the first picoengine and reference numeral 374 identifies its instruction control store. The program in the instruction control store for each picoengine can be updated and changed under software control via control block 375. Control block 375 is also usable to receive the statistics information 367 from the MAC island via XPB bus connections 368. To perform deeper and deeper analysis into the header structure of an incoming packet, the output of the pool 372 can be passed back through a tunnel recirculation path and tunnel recirculation FIFO 376 to the characterizer 371 in an iterative fashion. For an incoming packet, a picoengine classifies the packet and from the classification determines a buffer pool of ME islands (a buffer pool is a "set" of processing entities, where each ME island is an individual "processing entity" of the set) to which the packet will be forwarded for further processing. For example, ME island 348 can be configured to be part of a first set, whereas ME island 353 can be configured to be part of a second set. If the picoengine determines that the packet is a fast-path packet, then the picoengine indicates that the packet should be handled by the first set of processing entities, whereas if the picoengine determines that the packet is an exception packet then the picoengine determines that the packet should be handled by the second set of processing entities. The picoengine outputs preclassification results 377. The preclassification results 377 are part of an allocation request to the allocator circuit 381.

The programs stored in the instruction control store that are executable by the picoengines can be changed multiple times a second as the network appliance operates. Configuration block 384 receives configuration information from the control bus CB via connections 385 and supplies the configuration information to various ones of the sub-circuits of NBI island 347 that are configurable. Error detection and correction (ECC) circuitry 386 collects error information such as errors detected in the contents of the instruction stores. ECC circuitry 386 and ECC circuitry 387 are coupled via connections 388 and 389 and other internal island connections not shown to be part of the local event ring of which the ingress MAC island 347 is a part.

Figure 8:
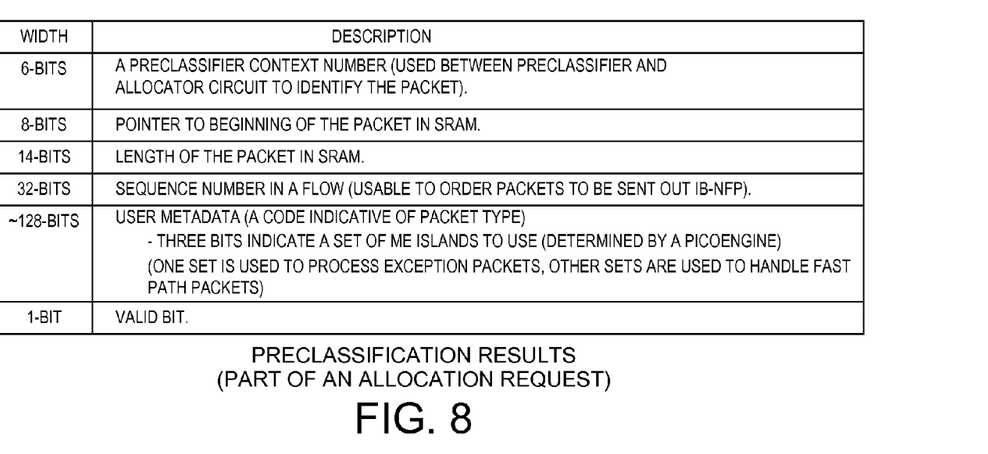
FIG. 8 is a table that sets forth fields of a "preclassification results" message 377 of FIG. 7.

FIG. 8 is a table that sets forth some of the fields of the preclassification results 377. As mentioned above, the preclassification results 377 form part of an "allocation request". The preclassification results 377 include: 1) a 6-bit preclassifier context number associated with the packet, where this preclassifier context number is used between the preclassifier picoengine and the allocator circuit 381 to identify a packet; 2) an 8-bit pointer to the beginning of where the packet is stored in SRAM 378; 3) a 14-bit value that indicates the length of the packet stored in SRAM 378; 4) a sequence number for the packet in a particular flow of packets through the IB-NFP; 5) a 128-bit amount of user metadata; and 6) a valid bit. The 128-bit amount of user metadata is a code generated by the picoengine, where the code includes certain information about the packet. In the present operational example, three of the bits of the user metadata indicate the number of the buffer pool (the number of the "set" of processing entities) that the picoengine has determined should process the packet. Another of the bits of the metadata indicates whether the packet is of a first type (an exception packet), or is of a second type (a fast-path packet). In response to receiving the allocation request (the "preclassification results 377" are part of the allocation request), the allocator circuit 381 goes through a credit-based allocation operation, and outputs an allocation command 382.

FIG. 9 is a table that sets forth the constituents of an allocation command. The allocation command includes: 1) a 5-bit reference number that identifies this allocation command, where this reference number will be returned later back to the allocator circuit in an allocation response; 2) a 6-bit number that identifies the particular ME island to which the allocation is being made, where the allocation command is also sent by the allocator circuit to the particular ME island so that the identification of the particular ME island to which the allocation is being made is also indicated by virtue of the ME island receiving the allocation command; and 3) a 2-bit number that indicates the size of the allocation to be made (0=256 bytes, 1=512 bytes, 2=1K bytes, 3=2K bytes). The packet engine of the receiving ME island uses this 2-bit size number to allocate memory space in its cluster target memory in preparation for the packet that will be received. The allocation command 382 passes through data bus interface 383, and across the CPP data bus, and across the CPP bus, through data bus island bridge 390 (see FIG. 10), through data bus interface 391, and to packet engine 392 of Cluster Target Memory (CTM) 393 in the ME island 348. The receiving ME island 348 is the particular ME island identified by the 6-bit ME island number of the allocation command 382.

Figure 10:
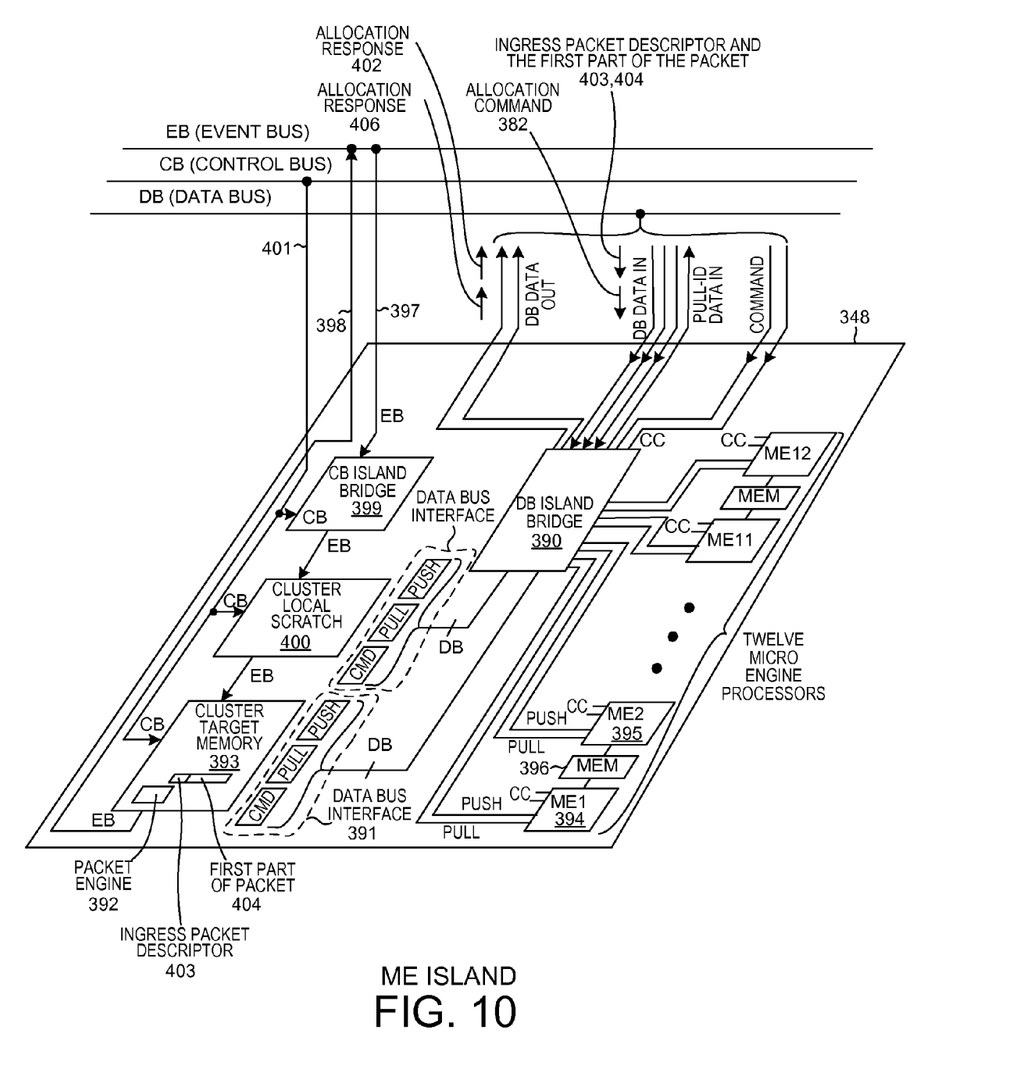
FIG. 10 is a diagram of the ME island 348 of the IB-BFP integrated circuit 311 of FIG. 5.

FIG. 10 is a diagram of the ME island 348. The microengines have, through the DB island bridge 390, a command out interface, a pull-id in interface, a pull-data out interface, and a push data in interface. There are six pairs of microengines, with each pair sharing a memory containing program code for the microengines. Reference numerals 394 and 395 identify the first pair of microengines and reference numeral 396 identifies the shared memory. As described further below, one of the microengines is assigned to process the packet. As a result of this processing, the microengine modifies an ingress packet descriptor thereby generating an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Memory errors and other events detected in the ME island are reported via a local event ring and the global event chain back to the ARM island. A local event ring is made to snake through the ME island for this purpose. Event packets from the local event chain are received via connections 397 and event packets are supplied out to the local event chain via connections 398. The CB island bridge 399, the cluster local scratch 400, and CTM 393 can be configured and are therefore coupled to the control bus CB via connections 401 so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as if the memory were outside the island in another island, except that bus transaction values do not have a final destination value. The bus transaction values do not leave the ME island and therefore do not need the final destination information. If, on the other hand, the target is not local within the ME island, then intelligence within the DB island bridge adds the final destination value before the bus transaction value is sent out onto the configurable mesh data bus. From the perspective of the microengine master, the interaction with the target has the same protocol and command and data format regardless of whether the target is local or remote.

In the operational example of the allocator circuit 381 being described here, the packet engine 392 receives the allocation command 382 via the CPP bus. From the 2-bit size number in the allocation command 382, the packet engine 392 allocates memory space in its Cluster Target Memory (CTM) 393. The packet engine 392 then causes a 10-bit packet number index to be included in a first allocation response 402. The first allocation response 402 is sent back to the allocator circuit 381 via the CPP bus.

FIG. 11 is a table that sets forth the various parts of an allocation response. An allocation response includes: 1) a 5-bit reference number that identifies the allocation command to which this allocation response is a response; and 2) a 9-bit packet number index. This packet number is an index into the packet allocation table of the packet engine. The index translates into an address for where in the cluster target memory of the ME island to store an ingress packet descriptor and the first part of a packet (for a task being allocated).

The allocator circuit 381 receives the first allocation response 402 and uses the 10-bit packet number to determine where in the CTM 393 to write an ingress packet descriptor and the first part of the packet. For each set of processing entities (an ME island is a processing entity), the allocator circuit 381 stores configuration information that indicates a split size. This split size indicates the maximum amount of data that can be written into the CTM in one allocation. If the amount of data to be moved (the ingress packet descriptor and the packet) is greater than the split size, then the ingress packet descriptor and the first part of the packet will be DMA transferred into the CTM, whereas the remaining second part of the packet will be DMA transferred into another memory (either internal SRAM, or external DRAM). For each set of processing entities, there is also stored in the allocator circuit 381: 1) an identifier for a primary buffer list, and 2) an identifier for a secondary buffer list. The actual buffer lists are stored in buffer lists block 407. The entries in a buffer list are pointers to buffers located in either SRAM 344, or in external DRAM 317-318. If the packet is to be split, then the allocator circuit 381 pops a buffer pointer off the appropriate buffer list, and supplies the buffer pointer to DMA engine 379. DMA engine 379 retrieves the packet from SRAM 378, and reads it across lines 380. The DMA engine 379 pushes the ingress packet descriptor (that is received from the allocator circuit 381) and the first part of the packet 383 across data bus interface 383, and across the CPP bus, and into the CTM 393. In FIG. 10, the ingress packet descriptor is identified by reference numeral 403, and the first part of the packet is identified by reference numeral 404. The DMA engine 379 then DMA transfers the second part of the packet 405 (if the packet is to be split) across data bus interface 383, and the CPP bus, and into the appropriate one of SRAM 344 or DRAM 317-318.

FIG. 12 is a table that sets forth some of the parts of an ingress packet descriptor. An ingress packet descriptor includes: 1) a 9-bit packet number, which is an index into the allocation table of the packet engine, that translates into an address for where in the CTM the first part of the packet is to be stored; 2) a 29-bit address indicating where and in which MU island the second part of the packet is to be stored; 3) A 14-bit value that indicates how long the packet is; and 4) user metadata. Three bits of the user metadata indicate the "set" of processing entities that that the picoengine determined should process the packet.

Next, the packet engine 392 assigns one or more microengines to handle the task. The assigned microengine uses information in the ingress packet descriptor 403 to retrieve all the necessary data of the packet. When the microengine has finished processing the packet, the packet engine 392 is alerted. In response, the packet engine 392 causes a second allocation response message 406 to be sent via the CPP bus back to the allocator circuit 381. The second allocation response message 406 reports that the task has been completed and that the associated amount of the resource is being freed up for another allocation. In the specific example described here, this indication of the amount of the resource being freed up includes: 1) an 11-bit packet credit value, and 2) a 9-bit buffer credit value.

The allocator circuit 381 receives the second allocation response 406 via the CPP bus. In an output generation phase, the allocator circuit 381 adjusts the stored resource value (the resource value RV of each bubble sorting module circuit whose PE value indicates the particular ME island 348 that sent the second allocation response 406). As explained above, in the present example, each resource value RV actually includes a packet credit value and a buffer credit value.

Operation of the Allocator Circuit in the Specific Network Appliance Example

In the case of the specific network appliance example of FIGS. 4-10, the resource value maintained by a bubble sorting module circuit in the allocator circuit 381 includes: 1) a buffer credit value, and 2) a packet credit value. Each buffer credit represents 2K bytes of memory space. The determining of whether to swap with a module circuit to the left or with a module circuit to the right is determined based on buffer credit information that is shared between neighboring module circuits. Within a module circuit, the buffer credit value is allowed to go negative for a single allocation, but the packet credit value is not allowed to go negative. In response to an allocation being made, the packet credit value (stored in a module circuit whose PE value indicates the appropriate processing entity) is decremented by one (because one packet has been allocated). After the packet has been processed and when an allocation response comes back from the processing entity, the packet credit value (stored in a module circuit whose PE value indicates the appropriate processing entity) is incremented by one. If the stored packet credit value reaches zero, then the buffer credit value being sent out (out from the module circuit) to the right is forced to be minus one, which indicates that the module circuit has no buffer credit. Swapping between this module circuit and the module circuit to its right is therefore likely. If the buffer credit value stored by a head module circuit is zero or if the buffer credit value being sent by the head to the right is minus one, and if an incoming allocation request is received for the set of processing entities (the head of which stores a zero buffer credit value or is outputting to its right a minus one value), then the allocation request is forced to wait for servicing by the control circuit until the next output determining phase, or the packet is dropped if the configuration drop enable bit is set.

Although the present invention has been described in connection with certain specific embodiments for instructional purposes, the present invention is not limited thereto. The resource value used to track the amount of the resource each processing entity has available may contain multiple sub-component values. The example above involving a buffer credit value and a packet credit value, and how the two values are used in a comparison to determine whether to swap, is but one example. There are multiple different rules that can be applied to the sub-component values of a resource value that can be applied in determining whether two swap. The processing entities to which the allocator circuit allocates can be relatively simple processors, or can be complex systems having many different components. Processing entities can perform computational tasks, decision and logic type tasks, communication tasks, data moving tasks, management and statistics collecting tasks, lookup tasks, packet modification tasks, exception handling tasks, and many other sorts of tasks and combinations of tasks. The processing entities can all be of identical construction and operation, or various ones of the processing entities can be different and can have different operations and capabilities. The allocator circuit is of general applicability, and is not limited to use in packet handling and networking circuits. Accordingly, various modifications, adaptations, and combinations of various features of the described embodiments can be practiced without departing from the scope of the invention as set forth in the claims.

What is claimed is:

1. A method comprising:
   (a) operating an allocator circuit in a sequence of output determining phases and bubble sorting phases, wherein each output determining phase is followed by a bubble sorting phase, and wherein each bubble sorting phase is followed by an output determining phase;
   (b) maintaining, on the allocator circuit, 1) a resource value for each of a plurality of processing entities and 2) an indication of a processing entity for each of the resource values, wherein the allocator circuit comprises a bubble sorting module circuit comprised of combinatory logic and a state machine to form one or more chains, wherein each chain corresponds to a set of processing entities, wherein the resource value for a processing entity is indicative of an amount of a resource the processing entity has available, wherein the plurality of processing entities includes the set of processing entities;
   (c) receiving onto the allocator circuit an allocation request, wherein the allocation request is indicative of: 1) an amount of the resource requested, and 2) the set of processing entities;
   (d) in a first output determining phase, 1) determining, based at least in part on a bubble sort output, one processing entity from the set of processing entities, and 2) adjusting the resource value for the determined processing entity, wherein the resource value is adjusted in (d) by the amount of the resource indicated by the allocation request;
   (e) sending an allocation command from the allocator circuit to the processing entity determined in (d);
   (f) in a bubble sorting phase bubble sorting indications of processing entities of the set of processing entities based on the resource values of the processing entities and thereby determining a bubble sort output for the set of processing entities;
   (g) receiving onto the allocator circuit an allocation response, wherein the allocation response is indicative of: 1) the determined processing entity, and 2) the amount of the resource; and
   (h) in a second output determining phase, adjusting the resource value of the determined processing entity indicated by the allocation response, wherein the resource value is adjusted in (h) by the amount of the resource indicated by the allocation response, and wherein (b) through (h) are performed by the allocator circuit.

2. The method of claim 1, wherein the bubble sort output identifies a processing entity.

3. The method of claim 1, wherein the allocator circuit comprises a plurality of bubble sorting module circuits, and wherein each bubble sorting module circuit stores a resource value and stores an indication of a processing entity.

4. The method of claim 3, wherein said bubble sorting of (f) involves an exchange of resource values and indications of processing entities between bubble sorting module circuits.

5. The method of claim 1, wherein each bubble sorting module circuit stores a buffer credit value and stores a packet credit value, and wherein the buffer credit value and the packet credit value together form the resource value.

6. The method of claim 1, wherein each output determining phase is of a first duration, and wherein each bubble sorting phase is of a second duration, and wherein the second duration is longer than the first duration.

7. The method of claim 1, wherein the resource is taken from a group consisting of: a memory space resource, a packet tracking resource, a combination of a memory space resource and a packet tracking resource, a processing resource, a communication throughput resource.

8. The method of claim 1, wherein the resource includes both: 1) resources for storing information about an amount of data, and 2) buffer space for storing the amount of data.

9. The method of claim 1, wherein the amount of the resource indicated in the allocation request is information about a packet, wherein the packet is processed by only the processing entity determined in (d).

10. The method of claim 1, wherein the allocator circuit allocates a task to the processing entity determined in (d) by virtue of sending the allocation command to the processing entity determined in (d).

11. The method of claim 1, further comprising:
   (i) determining, on a packet classifier, that a packet is to be processed by the set of processing entities, and sending the allocation request from the packet classifier to the allocator circuit.

12. The method of claim 1, wherein the allocator circuit is configurable such that the number of processing entities in the set of processing entities can be changed.

13. The method of claim 1, wherein the allocator circuit does not fetch, decode and execute any processor-executable instructions.

14. An allocator circuit that operates in a sequence of output determining phases and bubble sorting phases, wherein each output determining phase is followed by a bubble sorting phase, and wherein each bubble sorting phase is followed by an output determining phase, the allocator circuit comprising:
   a plurality of modules, wherein each module stores a resource value and an indication of a processing entity, wherein the resource value indicates an amount of a resource that the indicated processing entity has available, wherein selected adjacent ones of the modules are adapted to exchange resource values and indications of processing entities between them in bubble sorting phases; wherein the allocator circuit comprises a bubble sorting module circuit comprised of combinatory logic and a state machine to form one or more chains, wherein each chain corresponds to a set of processing entities; wherein the bubble sorting module circuit stores a buffer credit value and stores a packet credit value, and wherein the buffer credit value and the packet credit value together form the resource value; and
   a control circuit coupled to the plurality of modules, wherein the control circuit receives an allocation request and in response outputs an allocation command, wherein the allocation request includes an indication of the set of processing entities, wherein in an output determining phase the control circuit obtains an indication of a particular processing entity from the plurality of modules, and wherein the allocation command is indicative of the particular processing entity.

15. The allocator circuit of claim 14, wherein the allocation command is indicative of the particular processing entity by virtue of the allocation command being sent to the particular processing entity.

16. The allocator circuit of claim 15, wherein the control circuit stores configuration information, and wherein the configuration information determines which of the modules are associated with the set of processing entities.

17. The allocator circuit of claim 14, wherein there is one module associated with each processing entity of the set of processing entities, and wherein the modules associated with processing entities of the set are bubble sorted separately from processing entities that are not in the set.

18. The allocator circuit of claim 14, wherein the control circuit decrements a resource value associated with the particular processing entity after obtaining the indication of the particular processing entity, wherein the control circuit further receives an allocation response and in response increments the resource value associated with the particular processing entity.

19. The allocator circuit of claim 14, wherein each of the resource values stored by the modules includes a buffer credit value and a packet credit value.

20. An allocator circuit that operates in a sequence of output determining phases and bubble sorting phases, wherein each output determining phase is followed by a bubble sorting phase, and wherein each bubble sorting phase is followed by an output determining phase, the allocator circuit comprising:

a plurality of bubble sorting module circuits, wherein each bubble sorting module circuit stores a resource value and an indication of a processing entity, wherein the resource value indicates an amount of a resource that the indicated processing entity has available, wherein selected adjacent ones of the bubble sorting module circuits are coupled to one another such that they can exchange resource values and indications of processing entities between them in bubble sorting phases; wherein the allocator circuit comprises a bubble sorting module circuit comprised of combinatory logic and a state machine to form one or more chains, wherein each chain corresponds to a set of processing entities; wherein the bubble sorting module circuit stores a buffer credit value and stores a packet credit value, and wherein the buffer credit value and the packet credit value together form the resource value; and means coupled to the plurality of bubble sorting module circuits, for: 1) receiving an allocation request, wherein the allocation request includes an indication of the set of processing entities, 2) obtaining in an output determining phase an indication of a particular processing entity from the plurality of bubble sorting module circuits, 3) for adjusting the resource value stored in association with the particular processing entity, 4) for causing an allocation command to be output from the allocator circuit, wherein the allocation command is indicative of the particular processing entity, 5) for receiving an allocation response onto the allocator circuit and in response causing at least one resource value stored in the plurality of bubble sorting module circuits to be adjusted, wherein said at least one resource value indicates an amount of the resource that the particular processing entity has available.

21. The allocator circuit of claim 20, wherein the resource value stored in association with the particular processing entity is decremented as a result of the receiving of the allocation request, and wherein the resource value stored in association with the particular processing entity is incremented in response to the receiving of the allocation response.

22. The allocator circuit of claim 20, wherein the means is also for storing configuration information, wherein the configuration information determines which ones of the plurality of bubble sorting module circuits can exchange resource values and indications of processing entities with each other in a bubble sorting phase.

23. The allocator circuit of claim 20, wherein the allocation command is indicative of the particular processing entity by virtue of the allocation command being sent to the particular processing entity, and wherein the resource value stored by each of the bubble sorting module circuits includes a buffer credit value and a packet credit value.

* * * * *